(12) United States Patent
Attenborough (10) Patent No.: US 12,075,906 B2
(45) Date of Patent: Sep. 3, 2024

(54) APPLICATOR

(71) Applicant: Liam Attenborough, Bangor (AU)

(72) Inventor: Liam Attenborough, Bangor (AU)

( * ) Notice: Subject to any disclaimer, the term of this patent is extended or adjusted under 35 U.S.C. 154(b) by 464 days.

(21) Appl. No.: 17/421,166

(22) PCT Filed: Dec. 19, 2019

(86) PCT No.: PCT/AU2019/051403
§ 371 (c)(1),
(2) Date: Jul. 7, 2021

(87) PCT Pub. No.: WO2020/142800
PCT Pub. Date: Jul. 16, 2020

(65) Prior Publication Data
US 2022/0053920 A1   Feb. 24, 2022

(30) Foreign Application Priority Data
Jan. 9, 2019 (AU) ............................... 2019900069

(51) Int. Cl.
*A46B 11/00* (2006.01)
*A45D 34/04* (2006.01)
(Continued)

(52) U.S. Cl.
CPC ........ *A46B 11/0041* (2013.01); *A45D 34/042* (2013.01); *A46B 5/0095* (2013.01); *A46B 11/0034* (2013.01); *A46B 11/0062* (2013.01); *A46B 11/0089* (2013.01); *B05C 17/005* (2013.01); *B65D 35/38* (2013.01); *B65D 47/143* (2013.01); *B65D 51/32* (2013.01); *A45D 2200/054* (2013.01); *A46B 2200/1046* (2013.01); *A46B 2200/20* (2013.01); *A46B 2200/202* (2013.01)

(58) Field of Classification Search
CPC ............ A46B 11/0006; A46B 11/0034; A46B 11/0041; A46B 11/0062; A46B 11/0089; B05C 17/005; B65D 35/38; B65D 51/32
See application file for complete search history.

(56) References Cited

U.S. PATENT DOCUMENTS

| 4,040,753 A | 8/1977 | Griffith |
| 5,397,195 A | 3/1995 | Goncalves |
(Continued)

FOREIGN PATENT DOCUMENTS

| EP | 0398936 A1 | 11/1990 |
| WO | 89/07053 A1 | 8/1989 |
| WO | 2011/155843 A1 | 12/2011 |

OTHER PUBLICATIONS

Australian Patent Office International Preliminary Report for PCT Application No. PCT/AU2019/051403, dated Apr. 27, 2021, pp. 1-5.
(Continued)

*Primary Examiner* — Jennifer C Chiang
(74) *Attorney, Agent, or Firm* — Cahn & Samuels, LLP (57) ABSTRACT

An applicator for a container, the container for storing a substance to be applied and including an outlet through which the substance is to be discharged, wherein the applicator includes a brush head adapted to be located at the outlet; and a removable nozzle adapted to be optionally mounted over the brush head.

20 Claims, 13 Drawing Sheets

(51) Int. Cl.
  *A46B 5/00*    (2006.01)
  *B05C 17/005*  (2006.01)
  *B65D 35/38*   (2006.01)
  *B65D 47/14*   (2006.01)
  *B65D 51/32*   (2006.01)

(56) References Cited

U.S. PATENT DOCUMENTS

| | | | |
|---|---|---|---|
| 7,645,086 B2* | 1/2010 | Zhang | A46B 11/0041 |
| | | | 401/290 |
| 7,832,956 B2* | 11/2010 | Ross | A46B 11/0086 |
| | | | 401/133 |
| 9,872,557 B2* | 1/2018 | Jensen | A46B 7/00 |
| 2005/0249538 A1 | 11/2005 | Patel | |
| 2011/0220138 A1 | 9/2011 | Roberts et al. | |
| 2016/0360855 A1 | 12/2016 | Byun | |

OTHER PUBLICATIONS

European Patent Office, English Abstract for EP0398936 A1, printed Jul. 1, 2021.
European Patent Office, Supplementary European Search Report for EP App. No. EP 19 90 8561, Jul. 21, 2022, pp. 1-7.

* cited by examiner

APPLICATOR

FIELD OF THE INVENTION

The present invention relates to applicators for use with containers that store substances to be applied, such as, for example, squeeze bottles or container tubes for caulking guns that store glues, sealants and the like.

BACKGROUND OF THE INVENTION

Conventional applicators, like those used with containers that hold substances like glues, sealants and the like, include conical/frustoconical spouts through which substance is funnelled and discharged. After the substance has been discharged from the applicator, it is often necessary to spread, smooth, paint or reposition etc. the substance. Whist it may be preferable to utilise a separate tool to perform these finishing steps, it is generally not convenient for users to carry multiple tools, and they often use their fingers instead. This use of the fingers is not preferred as it can result in a user unnecessarily dirtying their hands and leaving glue residue on the finished product, contacting harmful substances, and/or receiving finger/hand injuries. For example, when smoothing sealant over a wood substance with the fingers, a user may receive painful splinters.

Any reference herein to known prior art does not, unless the contrary indication appears, constitute an admission that such prior art is commonly known by those skilled in the art to which the invention relates, at the priority date of this application.

SUMMARY OF THE INVENTION

In one broad form, the present invention provides an applicator for a container, the container for storing a substance to be applied and including an outlet through which the substance is to be discharged, wherein the applicator includes: a brush head adapted to be located at the outlet; and a removable nozzle adapted to be optionally mounted over the brush head.

In one form, the brush head is adapted to be removably securable to the container at the outlet. In one form, the brush head is configured to be removably securable to the container via a thread engagement.

In one form, the brush head includes a base and brush portion.

In one form, the base has a threaded passage therethrough that allows substance from the outlet to be discharged through to the brush portion, and, facilitates securement to the container.

In one form, the nozzle is configured to be mounted to the base of the brush head, over the brush portion. In one form, the nozzle is configured to be mounted to the base of the brush head via a thread engagement.

In one from, the brush portion includes bristles members. In one form, the brush portion includes a sponge member.

In one form the applicator further includes a removable cap that, when in place, blocks the nozzle such that substance cannot be discharged from the nozzle. In one form, the removable cap is securable to the nozzle. In one form, the removable cap is securable to the nozzle via a thread engagement.

In one form, the brush head and the nozzle are permanently linked by a first connector portion, and the nozzle and removable cap are permanently linked by a second connector portion.

In one form, the applicator is reusable.

In a further form, the present invention provides an applicator as described in any one of the above forms, in combination with a container for storing substance to be applied, the container including an outlet through which substance is to be discharged.

In one form, the container includes a removable end portion, opposite the outlet, that permits re-filling of the container.

In one form, the container is a squeeze bottle. In one from, the container is adapted to be used with a caulking gun. In one form, wherein the container is reusable.

In a further broad form, the present invention provides a container with an applicator for applying a substance stored in the container, the container including an outlet through which the substance is to be discharged, wherein the applicator includes: a brush portion integrally formed with the container at the outlet; and a removable nozzle adapted to be optionally mounted to the container, over the brush portion.

In one form, the nozzle is adapted to be mounted to the container via a threaded engagement. In one form, the outlet is located on a threaded spout configured to receive the nozzle thereon, the nozzle including a corresponding internal thread.

In one form, the brush portion includes bristles members. In one form, the brush portion includes a sponge member.

In one form, the container further includes a removable cap that, when in place, blocks the nozzle such that substance cannot be discharged from the nozzle. In one form, the removable cap is securable to the nozzle. In one from, the removable cap is securable to the nozzle via a thread engagement.

In one form, the container is a squeeze bottle. In one form, the container is adapted to be used with a caulking gun. In one from, the container is reusable.

BRIEF DESCRIPTION OF THE DRAWINGS

A detailed description of a preferred embodiment will follow, by way of example only, with reference to the accompanying figures of the drawings, in which:

FIG. 1b is an exploded front cross sectional view of the applicator of FIG. 1a;

FIG. 3b is an exploded front cross sectional view of the applicator of FIG. 3a;

FIG. 5b is an exploded front cross sectional view of the applicator in FIG. 5a;

FIG. 6b is an exploded front cross sectional view of the applicator in FIG. 6a;

FIGS. 16a and 16b show a top and front cross-sectional view respectively of a brush head according to one example, as shown in the applicator of FIG. 1a.

DETAILED DESCRIPTION

According to one aspect, embodiments of the invention provide an applicator to be used in conjunction with containers that store substances to be applied. Such containers include an outlet through which substance is to be discharged. The applicator includes a brush head adapted to be located at the outlet of the container, and a nozzle that may be optionally mounted over the brush head.

The brush head assists with spreading/smoothing/painting etc. of the substance as it is discharged. Whilst the brush head facilitates spreading/smoothing/painting etc. of substances at the time of discharge, the nozzle may be used when brushing is not required and/or more targeted substance application is preferred. The nozzle typically substantially encloses the brush head and funnels discharge to an open tip portion which may, for example, be substantially conical.

In such embodiments, the brush head is typically removably securable to the container at the outlet. This may be by a threaded engagement or by other means, such as bayonet fastening or snap lock engagement. The brush head is typically comprised of a base and a brush portion, with the base configured to be mounted to the container. The base typically has a passage therethrough that allows the contents of the container to be discharged through to the brush portion. The passage is also typically threaded to allow securement to the container outlet via a threaded engagement. The container outlet is typically formed in a threaded spout that receives the base of the brush head thereon.

The nozzle, when placed over the brush head, is typically configured to be mounted to the base of the brush head, with the brush portion enclosed therein. Typically, the nozzle secures to the outer surface of the base of the brush head via a threaded engagement. As with securement of the brush head to the container, it will be appreciated that a range of fastening mechanisms may be used to secure the nozzle to the base of the brush head, such as for example, bayonet fastening or snap lock type engagement.

According to another aspect, embodiments of the invention provide containers where all or part of the applicator in integral therewith. In such embodiments, the brush portion is typically integral with the container, and the nozzle adapted to be secured directly to the container. Generally, the container outlet is located on a threaded spout and adapted to receive the nozzle thereon, which has corresponding internal threading.

According to a further aspect, embodiments of the invention may be provided as an applicator and container combination or kit, that may be assembled.

It will be appreciated that in the embodiments of the aspects as described above, or other aspects, the brush portion may take a variety of forms. For example the brush portion may comprise bristles or may be a sponge brush. The bristles may be natural or synthetic, and may have a range of diameters and shapes. For example, the bristles may be formed from animal hair, like horse hair, or may be formed as flexible polymer/plastic fingers. Any bristles of the brush portion may also collectively form different shaped brush tips like, for example, conventional round tip or flat tip brushes.

It will also be appreciated that the applicators as described herein may be used to apply a range of different substances. Any fluid may be suitable, such as, for example glues, sealants, paints, sunscreens, aerosols, or cosmetics etc. The substance to be applied may also be air, whereby the brush head may help with cleaning the application area, rather than spreading/smoothing/painting of the applied substance (i.e. air in this instance).

To close or shut off the applicator, the applicators as described herein (in embodiments according to either the first or second or third aspects) may further include a removable cap that, when in place, blocks the nozzle such that substance cannot be discharged therefrom. The removable cap is typically securable to the nozzle via a threaded engagement but may be securable thereto by other means. The removable cap may take a variety of forms. In one example, the removable cap is shaped simply to cover the open tip portion of the nozzle, having substantially hollow conical shape. In other forms, the removable cap comprises a main handling body, with a substantially conical recess therein configured to receive the open tip portion of the nozzle.

In seeking to avoid instances where the brush head, nozzle or removable cap may be misplaced or lost, permanent connector portions may be included to link the elements together and/or to the container. In one example, the brush head and the nozzle are permanently linked by a first connector portion, and the nozzle and removable cap are permanently linked by a second connector portion.

Typically, the containers used with the applicators as descried herein are squeeze bottles or a container tubes configured for use with a caulking gun. However, it will be appreciated that the containers may take a variety of forms. In some forms, the container includes a removable end portion, opposite the outlet, that permits re-filling.

The applicators, containers, or applicators/container combinations described herein may also be re-usable.

Particular embodiments of the invention are shown in the Figures. The applicators in these embodiments are typically for applying glues, sealants or the like. However, it will be appreciated that, in these and other embodiments, applicators (or container/applicator combinations) according to the invention may be used to apply a range of substances, such as, for example paints, sunscreens, aerosols, cosmetics, air, and other fluids.

Figure 1A:
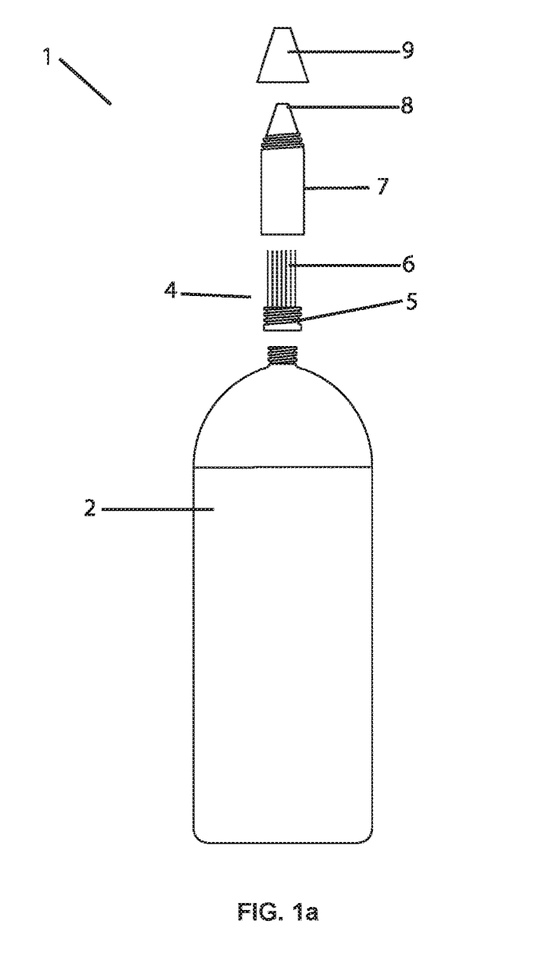
FIG. 1a is an exploded front view of one example of an applicator according to the invention.
Figure 1B:
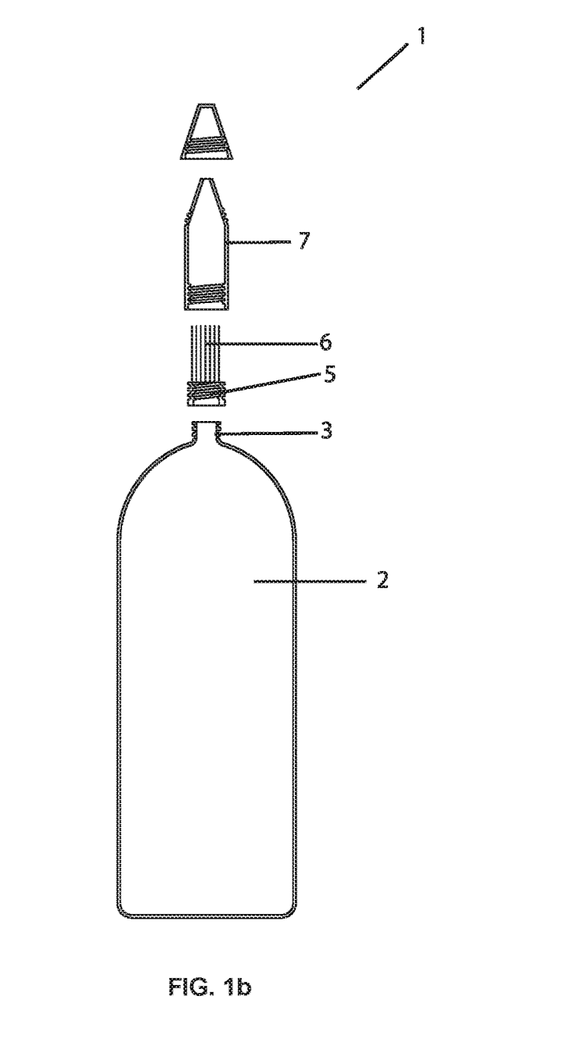

The embodiment as illustrated in FIGS. 1a and 1b shows an applicator (1) adapted to be used with a container (2) storing the substance to be applied. The container (2) includes an outlet (3) through which substance is to be discharged. The applicator includes a brush head (4), an optionally mountable nozzle (7), and removable cap (9). The brush head (4) is removably securable to the container at the outlet (3), via a screw thread engagement. The brush head (4) includes a base (5) and a brush portion (6). In this instance, the brush portion (6) comprises bristles.

Figure 16A:
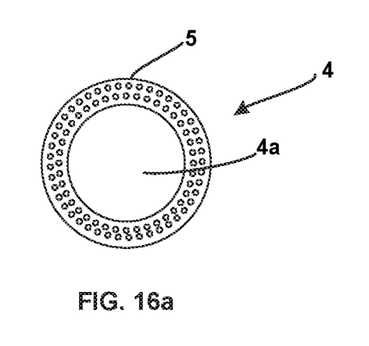

The base (5) of the brush head (4) includes a passage (4a) therethrough such that substance may be discharged from the container outlet (3) through to the bristles of the brush portion (6) (see FIG. 16a). The passage (4a) is also threaded to permit engagement with corresponding threading at the outlet (3) of the container. The outlet (3) is formed in an externally threaded spout, the spout receiving the base (5) of the brush head (4) thereon. Thus, as the content of the container is discharged from the outlet (3), it is guided through to the bristles of the brush portion (6) and can painted/brushed on to a surface.

Figure 16B:
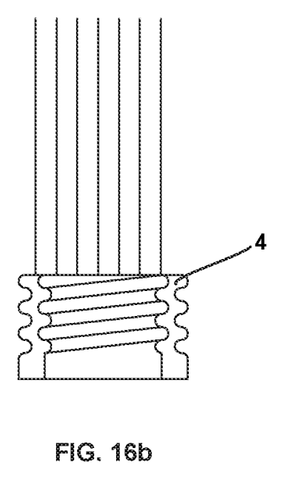

The bristles may be configured such that a central channel is provided for substance to pass directly through to the application surface, for subsequent brushing/painting (see for example FIGS. 16a and 16b). Alternatively or additionally, it may be that the bristles extend at least partially over the passage/outlet, so as to be substantially doused/coated in the relevant substance as it is discharged.

If brushing/painting type application is not required or not preferred, the nozzle (7) may be fitted/secured over the brush head (4). The nozzle (7) is secured to the base (5) of the brush head (4) via a screw thread engagement. The nozzle (7) includes an internal thread that corresponds to a thread on the outside surface of the base (5) of the brush head (4). When fitted, the nozzle (7) encloses the brush portion (6), and funnels substance from the container outlet (3) to a substantially conical open tip portion (8) for precision application therefrom.

Figure 11:
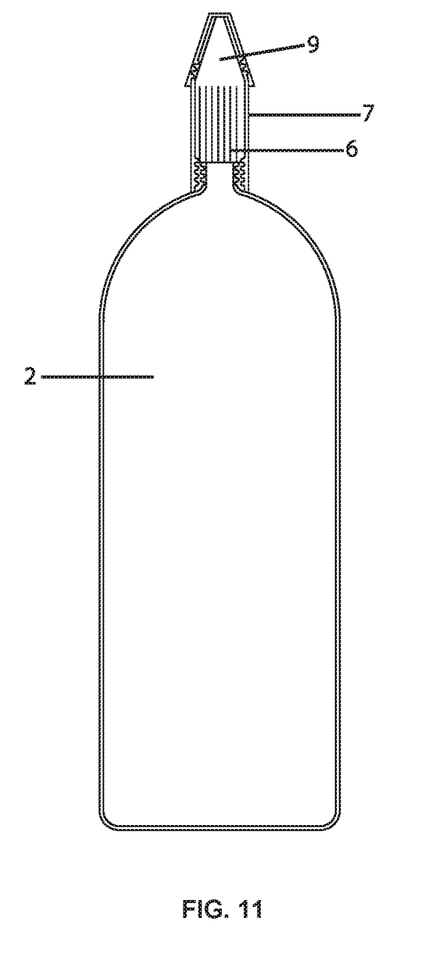
FIG. 11 is a front cross sectional view of the applicator in FIG. 1a, in assembled form.
Figure 12A:
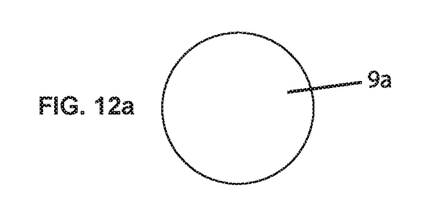
FIGS. 12a, b and c show top, front and side views respectively of the applicator from FIGS. 3a and 3b.
Figure 12B:
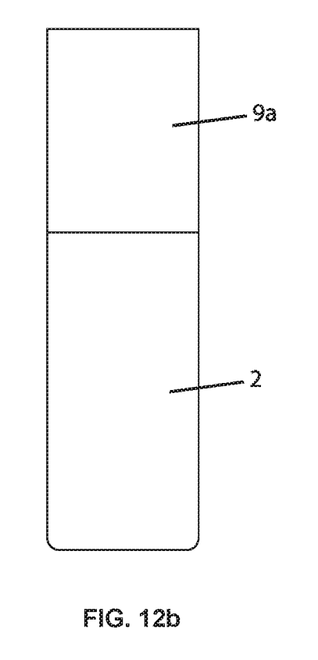
Figure 12C:
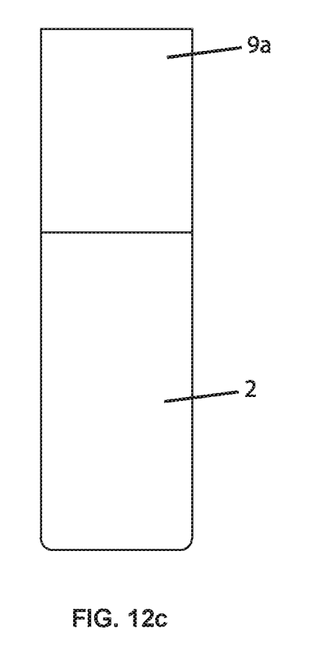

The removable cap (9) is securable to the nozzle (7) to seal/block off the opening of the tip portion (8). The applicator (1) from FIGS. 1a and 1b, in assembled from, with nozzle (7) and cap (9) in place, is shown in FIG. 11.

Figure 2:
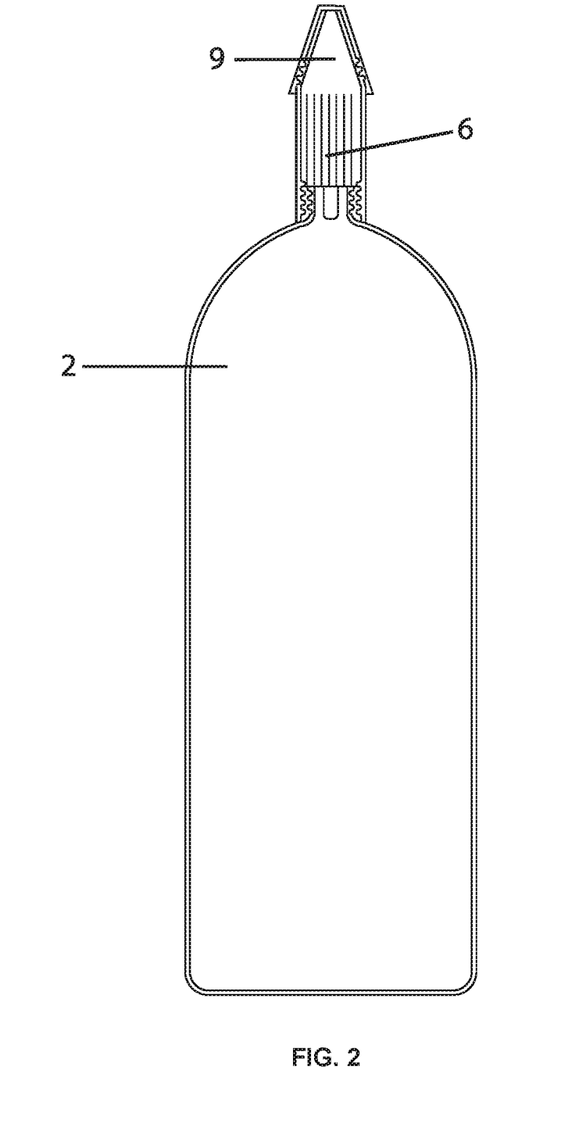
FIG. 2 is a front cross sectional view of a further example of an applicator according to the invention, in assembled form.
Figure 15A:
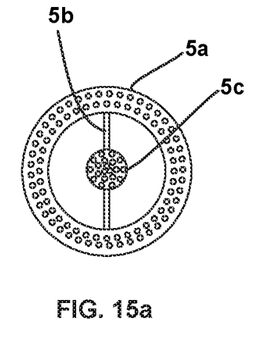
FIGS. 15a and 15b show a top and front cross-sectional view respectively of a brush head according to one example, as shown in the applicator of FIG. 2.
Figure 15B:
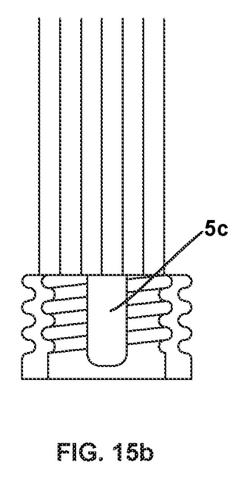

FIGS. 2, 15a, and 15b shows a modified form of brush head (4), wherein the base (5a) of the brush head includes a diametrically extending support portion (5b) that divides the passage (4a), providing multiple discharge path therethrough. The support portion suspends a centrally located rod/shaft portion (5c) in the passage (4a). As shown in FIGS. 15a and 15b, the centrally located rod/shaft portion (5c) extends axially through the passage (4a), the top surface thereof providing additional surface area upon which bristles are included.

Figure 3A:
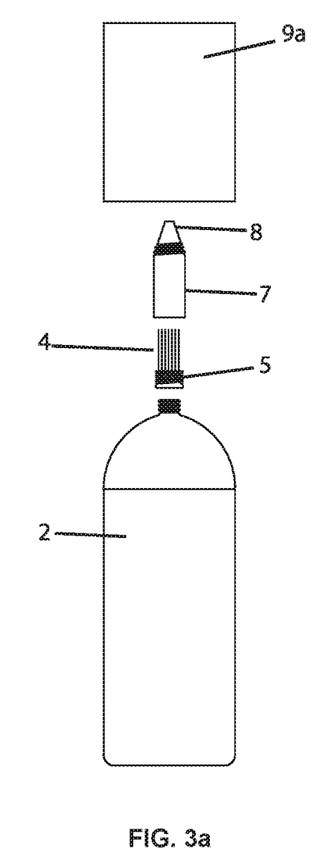
FIG. 3a is an exploded front view of a further example of an applicator according to the invention.
Figure 3B:
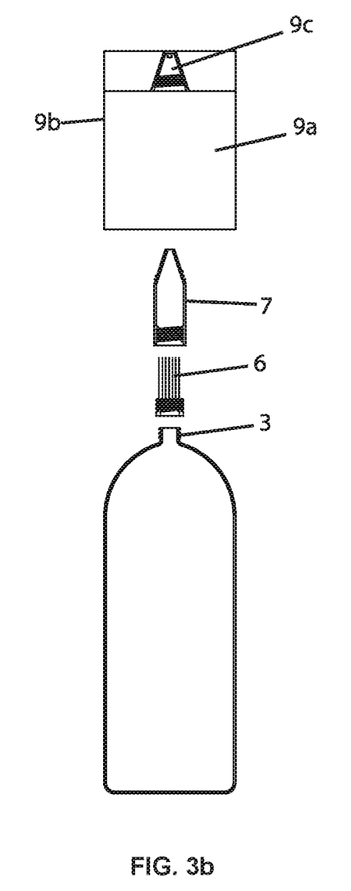
Figure 4:
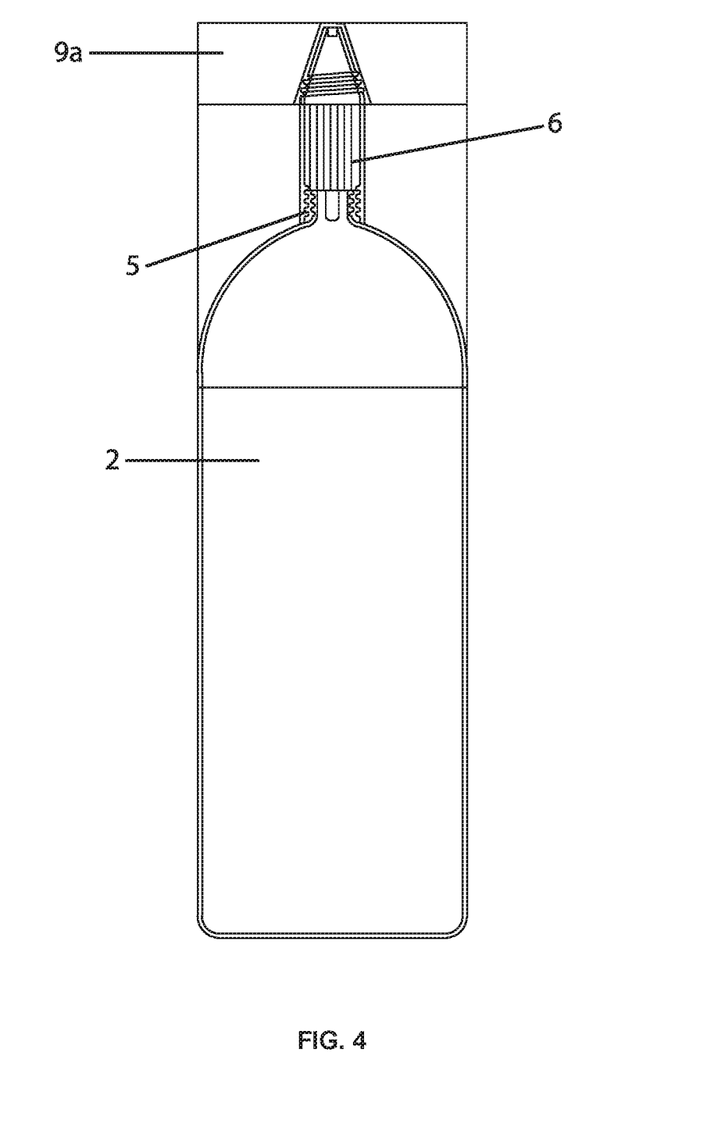
FIG. 4 is front cross sectional view of a further example of an applicator according to the invention, in assembled form.
Figure 5A:
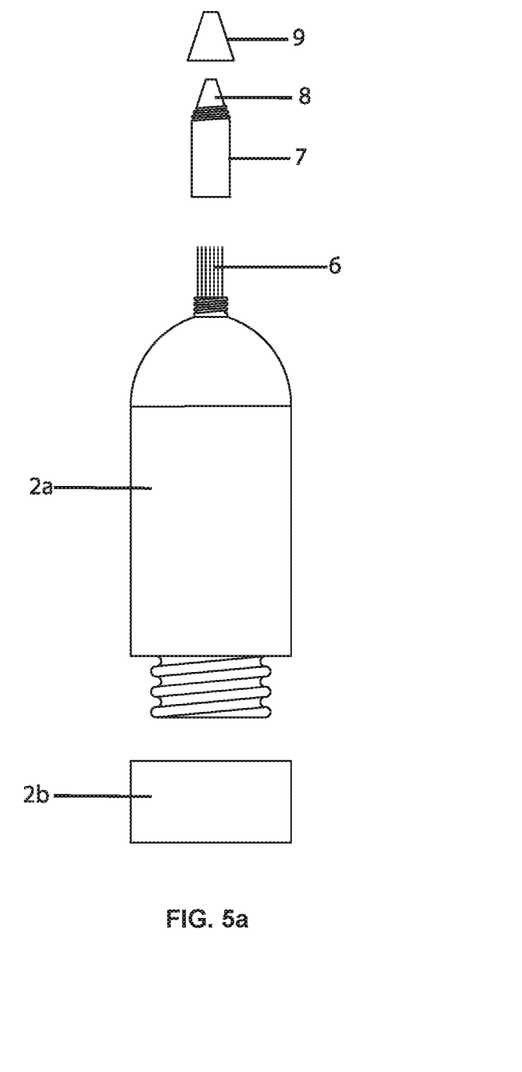
FIG. 5a is an exploded front view of a further example of an applicator according to the invention.
Figure 5B:
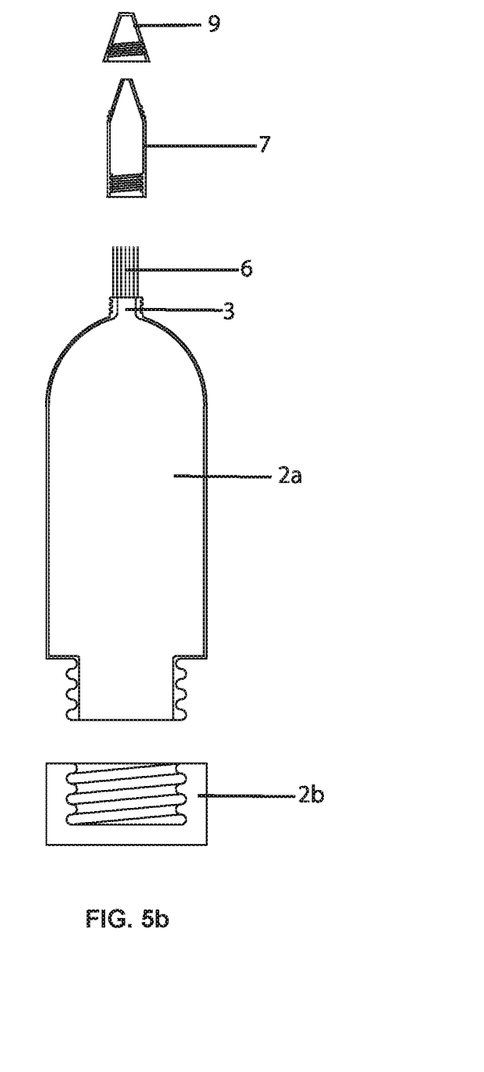
Figure 10:
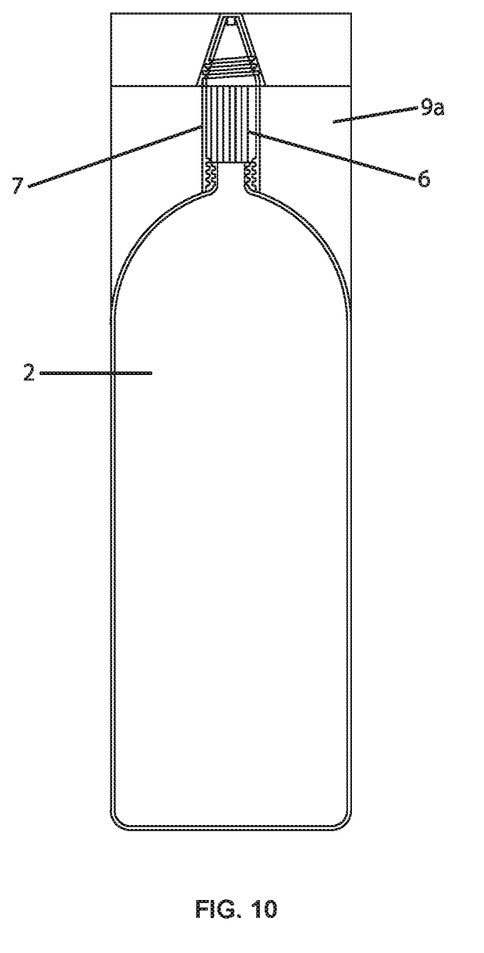
FIG. 10 is a front cross sectional view of the applicator in FIG. 3a, in assembled form.

A variation of the removable cap is shown in the embodiment of FIGS. 3a and 3b. In this embodiment, the removable cap (9a) comprises a cup-shaped main handling body (9b) adapted to fit over the entire brush head (4) and nozzle (7), and to fit the container (2) diameter. Within the main handling body (9b), a recess (9c) is included to receive the tip portion (8) of the nozzle therein. The recess (9c) is threaded to provide screw engagement of the cap (9a) to the nozzle (7). It will be appreciated that in other forms, the cap (9a) may be simply clipped in place using a snap lock type engagement or the like. FIG. 10 shows the assembled form of the embodiment of FIGS. 3a and 3b, with alternate cap (9a) in place. FIG. 4 shows this alternate cap version together with the modified brush head base (5a) from FIGS. 15a and 15b.

Figure 6A:
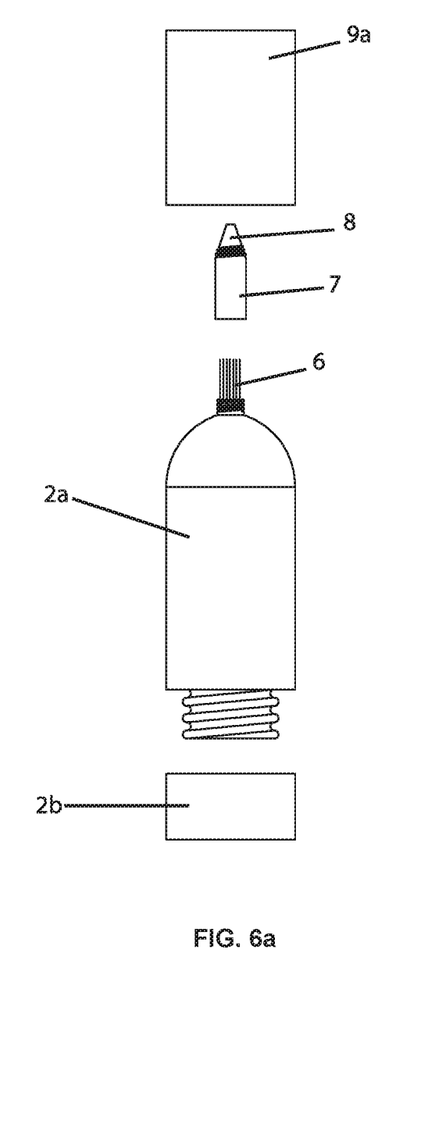
FIG. 6a is an exploded front view of a further example of an applicator according to the invention.
Figure 6B:
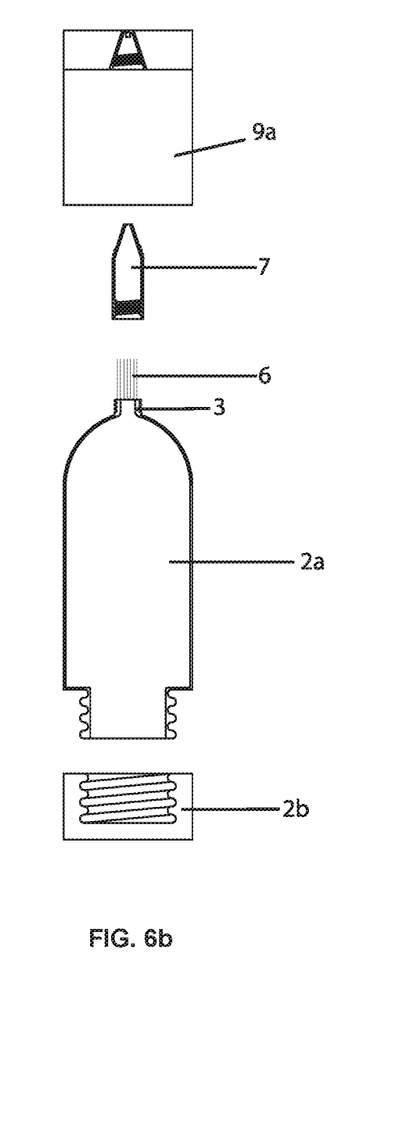

Further alternate embodiments of the invention are shown in FIGS. 5a, 5b, 6a and 6b. In these forms, part of the applicator is integral with the container (2a). In particular, the container (2a) includes an integral brush portion (6). The nozzle (7), rather than being secured to the base of the brush head, is secured directedly to the outlet spout of the container. In FIGS. 6a and 6b, the alternate cap (9a) with handling body (9b) is shown.

The containers (2a) in the embodiments of FIGS. 5a, 5b, 6a, 6b are also different in that they have removable ends (2b) opposite the outlet ends thereof. The removable ends (2b) are secured/removed from the container main body (2a) using a screw type engagement. This permits re-filling of the containers.

Figure 7:
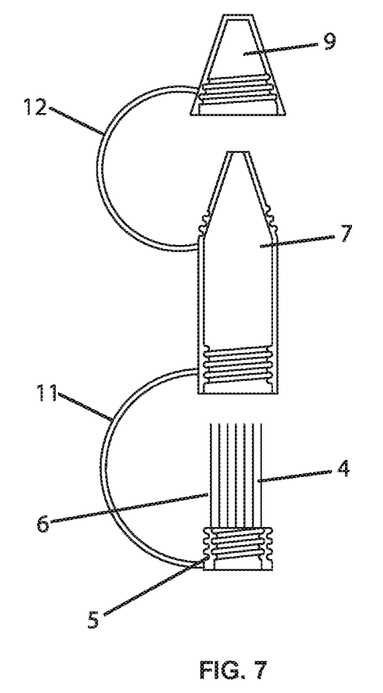
FIG. 7 is an exploded front view of one example of brush head, nozzle and removable cap with permanent linking connections therebetween.
Figure 8:
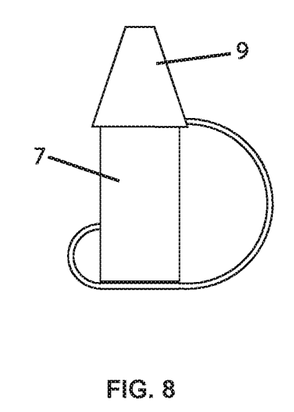
FIG. 8 is a front view of the brush head, nozzle and removable cap from FIG. 7, in assembled form.
Figure 9A:
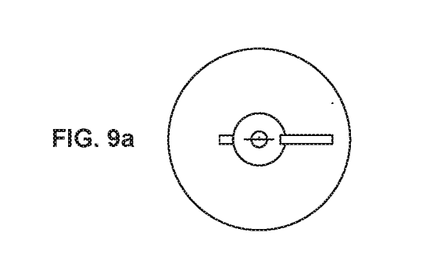
FIGS. 9a, b and c, show top, front and side views respectively of an applicator according one example of the invention, including the brush head, nozzle, and cap from FIGS. 7 and 8.
Figure 9B:
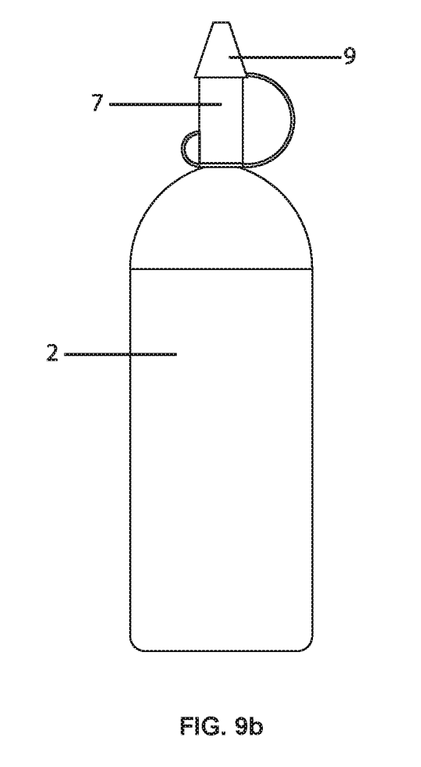
Figure 9C:
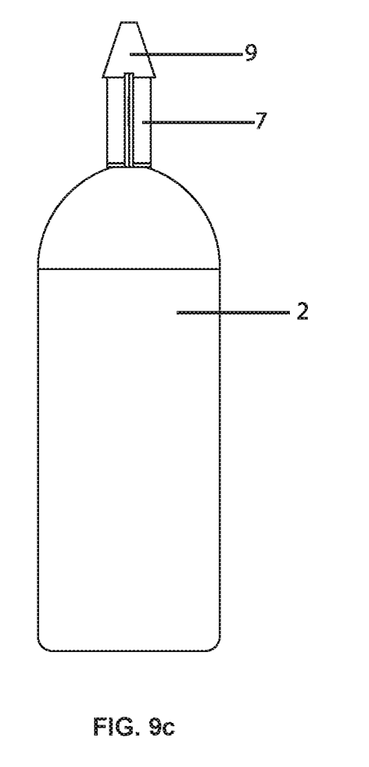

In seeking to avoid situations where the brush head (4), nozzle (7) or cap (9) may be misplaced, the elements may be permanently linked together with connector portions i.e. as shown in FIGS. 7 and 8. A first connector portion (11) permanently connects the brush head (4) and nozzle (7), and a second connector portion (12) permanently connecting the nozzle (7) and removable cap (9). FIG. 9 shows the applicator form of FIGS. 7 and 8, when secured to a container.

Figures 13, 14:
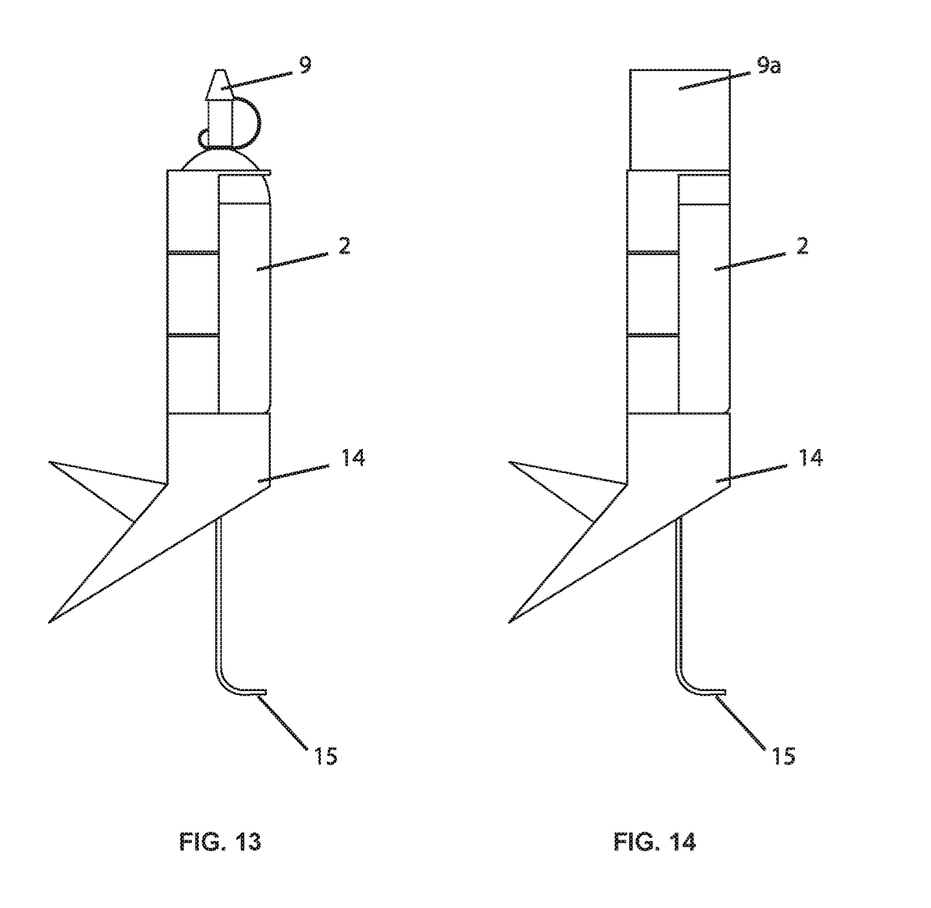
FIG. 13 shows a side view of one example of an applicator including brush head nozzle and cap from FIGS. 7 and 8 when implemented with a container suitable for use with a caulking gun.
FIG. 14 shows a side view of one example of an applicator with the removable cap as shown in FIG. 12, when implemented with a container suitable for use with a caulking gun.
Figure 17:
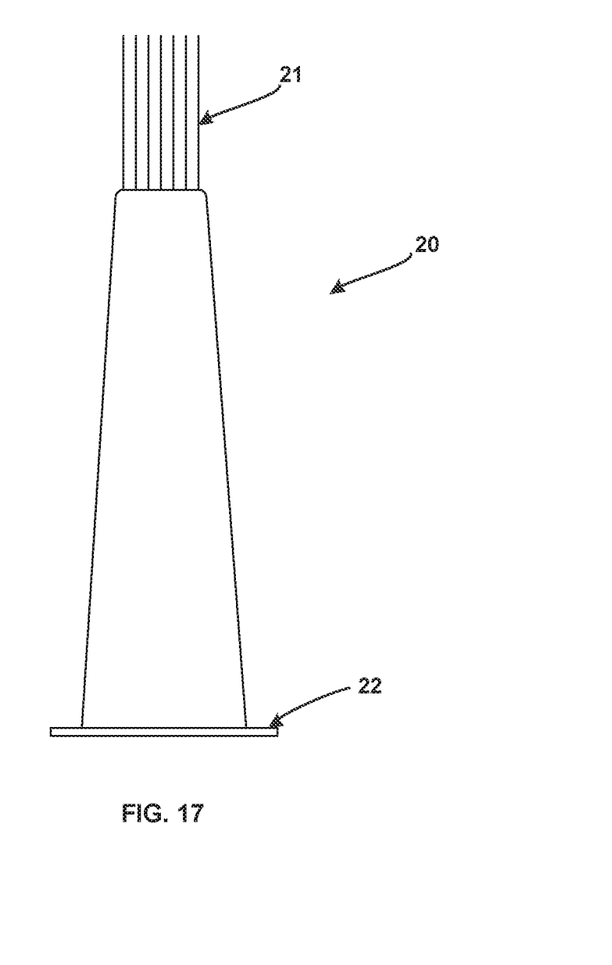
FIG. 17 shows a front view of a brush head according to one example suitable for use with a sausage type caulking gun.

As shown in FIGS. 13 and 14, the applicators and applicator/container combinations described herein may be utilised with containers that can fit into caulking guns. Furthermore, in other forms, the applicators as described herein may be adapted for use with sausage type calking guns. FIG. 17 shows one example of a brush head (20) suitable for a sausage type caulking gun. The brush head includes bristles (21) at the tip thereof and a retaining flange (22) at the base. The retaining flange (22) allows mounting to the sausage gun, and when mounted, abuts an internal rim of the gun assembly so that it cannot be removed.

It will also be appreciated that, in the various embodiments described herein, the brush heads, nozzles and sealing caps etc. may be interchangeably secured with each other and/or the relevant container by means other than screw threading, such as, for example, by clip on or snap lock type connection.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. An applicator for a container, the container for storing a substance to be applied and including an outlet through which the substance is to be discharged, wherein the applicator includes:

a brush head adapted to be located at the outlet such that the brush head extends outwardly from the outlet and permits substance to be applied therethrough; and a removable nozzle with an open tip, the removable nozzle adapted to be optionally mounted over the brush head, such that the brush head does not extend through the open tip.

2. The applicator as claimed in claim 1, wherein the brush head is adapted to be removably securable to the container at the outlet.

3. The applicator as claimed in claim 2, wherein the brush head is configured to be removably securable to the container via a thread engagement.

4. The applicator as claimed in claim 1, wherein the brush head includes a base and a brush portion, the base having a threaded passage therethrough that facilitates securement to the container and allows substance from the outlet to be discharged through to the brush portion.

5. The applicator as claimed in claim 4, wherein the nozzle is configured to be mounted to the base of the brush head over the brush portion.

6. The applicator as claimed in claim 5, wherein the nozzle is configured to be mounted to the base of the brush head via a thread engagement.

7. The applicator as claimed in claim 1, further including a removable cap that, when in place, blocks the nozzle such that substance cannot be discharged from the nozzle.

8. The applicator as claimed in claim 7, wherein the removable cap is securable to the nozzle via a thread engagement.

9. The applicator as claimed in claim 7, wherein the brush head and the nozzle are permanently linked by a first connector portion, and the nozzle and removable cap are permanently linked by a second connector portion.

10. The applicator as claimed claim 1, wherein the applicator is reusable.

11. The applicator as claimed in claim 1, in combination with a container for storing substance to be applied, the container including an outlet through which substance is to be discharged.

12. The applicator in combination with a container as claimed in claim 11, wherein the container is reusable and includes a removable end portion, opposite the outlet, that permits re-filling of the container.

13. The applicator in combination with a container as claimed in claim 11, wherein the container is adapted to be used with a caulking gun.

14. A container with an applicator for applying a substance stored in the container, the container including an outlet through which the substance is to be discharged, wherein the applicator includes:

a brush portion integrally formed with the container at the outlet such that the brush portion extends outwardly from the outlet; and a removable nozzle with an open tip, the removable nozzle adapted to be optionally mounted to the container, over the brush portion, such that the brush portion does not extend through the open tip.

15. The container as claimed in claim 14, wherein the nozzle is adapted to be mounted to the container via a threaded engagement.

16. The container as claimed in claim 15, wherein the outlet is located on a threaded spout configured to receive the nozzle thereon, the nozzle including a corresponding internal thread.

17. The container as claimed in claim 14, further including a removable cap that, when in place, blocks the nozzle such that substance cannot be discharged from the nozzle.

18. The container as claimed in claim 17, wherein the removable cap is securable to the nozzle via a thread engagement.

19. The container as claimed in claim 14, wherein the container is adapted to be used with a caulking gun.

20. The container as claimed in claim 14, wherein the container is reusable and includes a removable end portion, opposite the outlet, that permits re-filling of the container.

* * * * *